United States Patent
Lord et al.

(10) Patent No.: US 10,718,272 B2
(45) Date of Patent: Jul. 21, 2020

(54) VARIABLE-GEOMETRY BOUNDARY LAYER DIVERTER

(71) Applicant: UNITED TECHNOLOGIES CORPORATION, Farmington, CT (US)

(72) Inventors: Wesley K. Lord, South Glastonbury, CT (US); Matthew R Feulner, West Hartford, CT (US); Gabriel L. Suciu, Glastonbury, CT (US); Jesse M. Chandler, South Windsor, CT (US)

(73) Assignee: United Technologies Corporation, Farmington, CT (US)

(*) Notice: Subject to any disclaimer, the term of this patent is extended or adjusted under 35 U.S.C. 154(b) by 427 days.

(21) Appl. No.: 15/490,155

(22) Filed: Apr. 18, 2017

(65) Prior Publication Data

US 2018/0298829 A1   Oct. 18, 2018

(51) Int. Cl.
| | | |
|---|---|---|
| *B64D 27/14* | (2006.01) | |
| *F02C 9/18* | (2006.01) | |
| *F02K 3/06* | (2006.01) | |
| *B64D 33/02* | (2006.01) | |
| *B64C 21/06* | (2006.01) | |
| *B64C 21/02* | (2006.01) | |

(52) U.S. Cl.
CPC ............... *F02C 9/18* (2013.01); *B64C 21/02* (2013.01); *B64C 21/06* (2013.01); *B64D 27/14* (2013.01); *B64D 33/02* (2013.01); *F02K 3/06* (2013.01); *B64C 2230/06* (2013.01); *B64D 2033/0226* (2013.01); *B64D 2033/0286* (2013.01); *F05D 2250/90* (2013.01); *F05D 2270/17* (2013.01); *Y02T 50/166* (2013.01)

(58) Field of Classification Search
CPC .. F02C 9/18; F02K 3/06; B64D 27/14; B64D 33/02; B64C 21/06; B64C 21/02; F05D 2250/90; F05D 2270/17
USPC .......................................................... 42/53 B
See application file for complete search history.

(56) References Cited

U.S. PATENT DOCUMENTS

| | | |
|---|---|---|
| 2,950,594 A | 8/1960 | Mitrovich et al. |
| 3,029,600 A | 4/1962 | Young |
| 3,109,610 A | 11/1963 | Quenzler et al. |
| 3,430,640 A | 3/1969 | Lennard |
| 4,655,413 A | 4/1987 | Genssler et al. |
| 5,182,905 A * | 2/1993 | Stransky .......... F02C 7/18 60/204 |
| 5,586,735 A | 12/1996 | Falempin et al. |
| 8,359,825 B2 | 1/2013 | Alvi |

(Continued)

FOREIGN PATENT DOCUMENTS

| | | |
|---|---|---|
| JP | S55156800 | 12/1980 |
| WO | 2008017567 A1 | 2/2008 |

OTHER PUBLICATIONS

Extended European Search Report for EP Application No. 18168010.9, dated Jun. 26, 2018.

*Primary Examiner* — J. Woodrow Eldred
(74) *Attorney, Agent, or Firm* — Carlson, Gaskey & Olds, P.C.

(57) ABSTRACT

A gas turbine engine comprises a housing having an inlet leading to a fan rotor. A bypass door is mounted upstream of the inlet to the fan rotor, and is moveable away from a non-bypass position to a bypass position to selectively bypass boundary layer air vertically beneath the engine. An aircraft is also disclosed.

13 Claims, 2 Drawing Sheets

(56) References Cited

U.S. PATENT DOCUMENTS

| | | |
|---|---|---|
| 9,611,034 B1 | 4/2017 | Suciu et al. |
| 2003/0132342 A1 | 7/2003 | Koncsek et al. |
| 2016/0376018 A1 | 12/2016 | Troia et al. |
| 2017/0066527 A1 | 3/2017 | Huynh et al. |
| 2018/0298829 A1* | 10/2018 | Lord .................. F02C 9/18 |

* cited by examiner

VARIABLE-GEOMETRY BOUNDARY LAYER DIVERTER

STATEMENT REGARDING FEDERALLY SPONSORED RESEARCH OR DEVELOPMENT

The subject of this disclosure was made with government support under Contract No.: NND15AC56C awarded by NASA. The government therefore may have certain rights in the disclosed subject matter.

BACKGROUND OF THE INVENTION

This application relates to an arrangement of gas turbine engines in a wide fuselage aircraft to selectively bypass boundary layer air around the engines.

Gas turbine engines are known and typically include a fan delivering air into a compressor section. The air is compressed and delivered into a combustor where it is mixed with fuel and ignited. Products of this combustion pass downstream over turbine rotors driving them to rotate.

One potential application for gas turbine engines is in next generation aircraft with boundary layer ingestion into the propulsion system. One future aircraft has a wide fuselage. The aircraft is to be driven by twin gas turbine engines mounted in the tail section. The engines extend vertically upwardly above the fuselage.

The wide fuselage will create a large boundary layer of the air approaching the engines. Ingestion of the fuselage boundary layer enables an increase in the engine propulsive efficiency for improved fuel burn performance, but also raises challenges for the engine operation and, in particular, for the fan rotor.

As known, an aircraft experiences a number of different conditions during a typical flight cycle. The boundary layer may be ingested adequately by the engine during numerous operational conditions where the fan speed and inlet airflow are relatively high, such as takeoff or climb.

However, at the top of descent, a pilot will typically pull back the throttle, slowing the fan speed and reducing the inlet airflow. At the same time, the aircraft may still be at a relatively high velocity. Under such conditions, the boundary layer could become problematic with respect to engine operability or fan blade stress.

SUMMARY OF THE INVENTION

In a featured embodiment, a gas turbine engine comprises a housing having an inlet leading to a fan rotor. A bypass door is mounted upstream of the inlet to the fan rotor, and is moveable away from a non-bypass position to a bypass position to selectively bypass boundary layer air vertically beneath the engine.

In another embodiment according to the previous embodiment, the bypass door is moved to pivot vertically downwardly from an upstream end of the inlet to the gas turbine engine and to a bypass position at which it is spaced vertically beneath the upstream end of the inlet to the engine.

In another embodiment according to any of the previous embodiments, the bypass door and the upstream end of the inlet to the fan rotor are both curved.

In another embodiment according to any of the previous embodiments, the bypass door is moved to the bypass position at conditions where the fan rotor is being driven more slowly than at other conditions.

In another embodiment according to any of the previous embodiments, the conditions where the bypass door is moved to the bypass position include a top of descent condition wherein an associated aircraft is moving at a relatively high velocity.

In another embodiment according to any of the previous embodiments, the bypass door and the upstream end of the inlet to the fan rotor are both curved.

In another embodiment according to any of the previous embodiments, the bypass door is moved to the bypass position at conditions where the fan rotor is being driven more slowly than at other conditions.

In another embodiment according to any of the previous embodiments, the conditions where the bypass door is moved to the bypass position include a top of descent condition wherein an associated aircraft is moving at a relatively high velocity.

In another embodiment according to any of the previous embodiments, the bypass door is moved to the bypass position at conditions where the fan rotor is being driven more slowly than at other conditions.

In another embodiment according to any of the previous embodiments, the conditions where the bypass door is moved to the bypass position include a top of descent condition wherein an associated aircraft is moving at a relatively high velocity.

In another featured embodiment, an aircraft comprises a relatively wide fuselage and a tail section, with a pair of gas turbine engines mounted in the tail section and extending vertically above the fuselage. The gas turbine engines have a housing with an inlet leading to a fan rotor. A bypass door is mounted upstream of the inlet to the fan rotor, and is moveable away from a non-bypass position to a bypass position to selectively bypass boundary layer air vertically beneath the engine.

In another embodiment according to the previous embodiment, the bypass door is moving to pivot vertically downwardly from an upstream end of the inlet to the gas turbine engine and to a bypass position at which it is spaced vertically beneath the upstream end of the inlet to the engine.

In another embodiment according to any of the previous embodiments, the bypass door and the upstream end of the inlet to the fan rotor are both curved.

In another embodiment according to any of the previous embodiments, the bypass door is moved to the bypass position at conditions where the fan rotor is being driven more slowly than at other conditions.

In another embodiment according to any of the previous embodiments, the conditions where the bypass door is moved to the bypass position include a top of descent condition wherein an associated aircraft is at a relatively high velocity.

In another embodiment according to any of the previous embodiments, the bypass door and the upstream end of the inlet to the fan rotor are both curved.

In another embodiment according to any of the previous embodiments, the bypass door is moved to the bypass position at conditions where the fan rotor is being driven more slowly than at other conditions.

In another embodiment according to any of the previous embodiments, the conditions where the bypass door is moved to the bypass position include a top of descent condition wherein an associated aircraft is at a relatively high velocity.

In another embodiment according to any of the previous embodiments, the bypass door is moved to the bypass position at conditions where the fan rotor is being driven more slowly than at other conditions.

In another embodiment according to any of the previous embodiments, the conditions where the bypass door is moved to the bypass position include a top of descent condition wherein an associated aircraft is at a relatively high velocity.

These and other features may be best understood from the following drawings and specification.

DETAILED DESCRIPTION

Figure 1A:
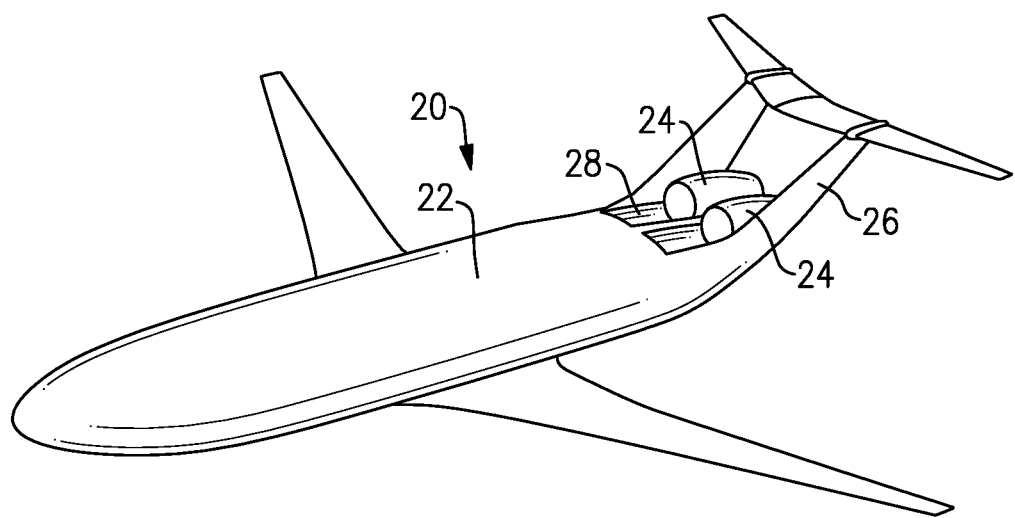
FIG. 1A schematically shows a future aircraft.

An aircraft 20 is illustrated in FIG. 1A having a wide fuselage body 22. A pair of gas turbine engines 24 are mounted within a tail section 26.

Selectively moveable bypass doors 28 are positioned forwardly of an inlet to the engines 24, as will be explained below.

Figure 1B:
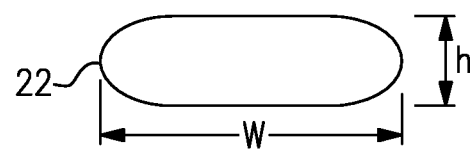
FIG. 1B shows a feature of the future aircraft.

A definition of a wide noncylindrical fuselage is illustrated in FIG. 1B. A width W defined between lateral sides of the fuselage is significantly greater than a height h. In embodiments, W may be more than twice h.

Figure 2A:
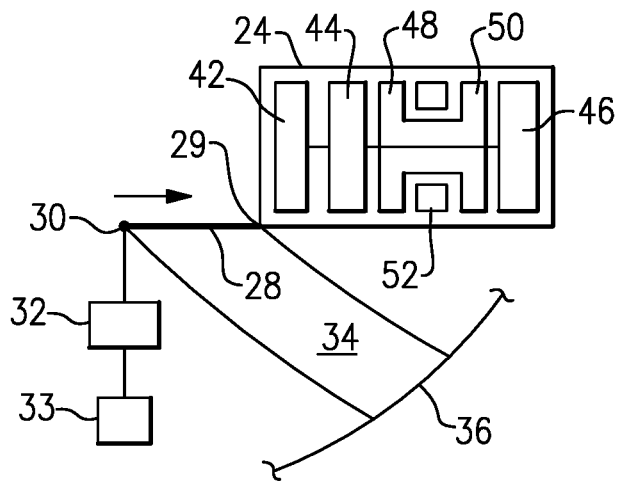
FIG. 2A shows a boundary layer bypass in a non-bypass position.

Under such conditions, there will be a boundary layer atop the fuselage and approaching the inlet to the engines 24. FIG. 2A shows a non-bypass position for a bypass door 28. As shown schematically, the bypass door 28 pivots about a point 30 and driven by a motor 32 which is controlled by a control 33. As shown, an upstream end 29 of the inlet into the engine meets a downstream end of the bypass door 28. In this position, the boundary layer is ingested into the engine. This position may be utilized at takeoff and climb, as well as cruise.

Figure 2B:
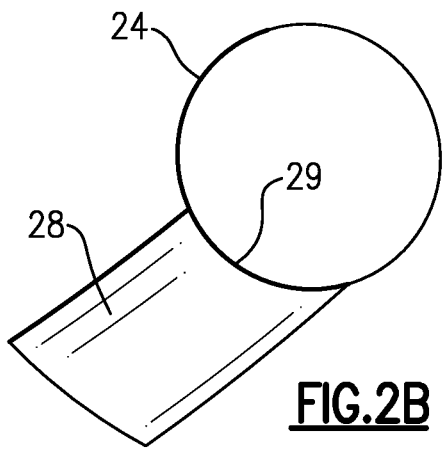
FIG. 2B shows a detail view of the 2A position.

As to be understood from FIG. 2B, the bypass door 28 and the upstream end 29 of the inlet to the fan rotor are both curved.

As shown, a passage 34 extends vertically beneath the engine 24 into an outlet 36. However, with the bypass door 28 in the non-bypass position air does not move into passage 34.

As shown schematically, engine components 40 include a fan 42, a low pressure compressor 44, and a low pressure turbine 46 driving fan rotor 42 and compressor 44. A high pressure compressor 48 is driven by a high pressure turbine 50. A combustor 52 is shown.

Under certain conditions, the ingestion of the boundary layer would prove problematic to the fan rotor 42. In particular, if the aircraft 20 is still moving at a relatively high velocity, and the fan speed is decreased to flight idle for the descent, the boundary layer air may be problematic. As one example, a top of descent condition may be such a condition. It may be advantageous to have the boundary layer bypass deployed open during the entire descent portion of the flight, from the cruise altitude to the end of descent at 1500 ft altitude.

Figure 3:
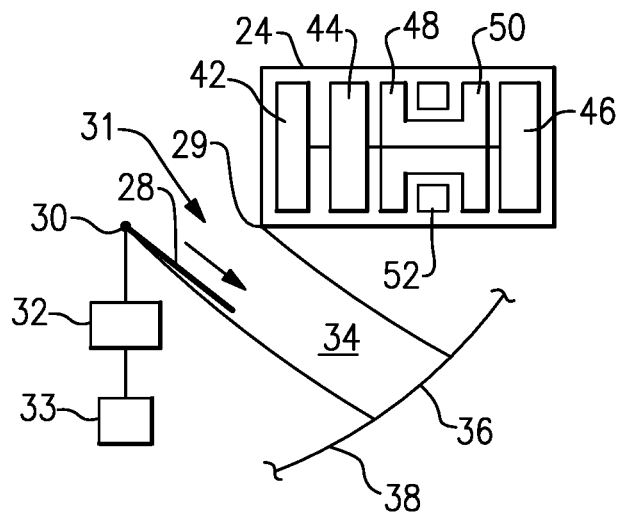
FIG. 3 shows the bypass in a bypass position.

FIG. 3 shows the movement of the bypass door 28 under such a condition. Door 28 pivots vertically downwardly. There is a gap 31 between an upstream end 29 of the engine 24 and a downstream end of the bypass door 28. The boundary layer air may pass through this opening 31 beneath the engine into the passage 34 and be directed, as shown at 36, outwardly of the aircraft 20. Outlet 36 delivers air beneath the lower end 38 of the aircraft 20.

A control 33 is programmed to know when to move the boundary layer door and will do so under conditions as mentioned above and any other conditions that would suggest bypassing the boundary layer air.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine assembly comprising:
   a housing having an inlet leading to a fan rotor;
   a bypass door mounted upstream of said inlet to said fan rotor, and said bypass door being moveable away from a non-bypass position to a bypass position to selectively bypass air to a location vertically beneath the engine and away from said inlet; and
   wherein said bypass door is moved to pivot vertically downwardly from an upstream end of said inlet to said gas turbine engine and to a bypass position at which it is spaced vertically beneath said upstream end of said inlet to said engine.

2. The gas turbine engine assembly as set forth in claim 1, wherein said bypass door and said upstream end of said inlet to said fan rotor are both curved.

3. The gas turbine engine assembly as set forth in claim 2, wherein said bypass door is moved to said bypass position at conditions where the fan rotor is being driven more slowly than at other conditions.

4. The gas turbine engine assembly as set forth in claim 3, wherein said conditions where said bypass door is moved to said bypass position include a top of descent condition wherein an associated aircraft is moving at a relatively high velocity.

5. The gas turbine engines assembly as set forth in claim 1, wherein said bypass door is moved to said bypass position at conditions where the fan rotor is being driven more slowly than at other conditions.

6. The gas turbine engine assembly as set forth in claim 5, wherein said conditions where said bypass door is moved to said bypass position include a top of descent condition wherein an associated aircraft is moving at a relatively high velocity.

7. An aircraft comprising:
   a relatively wide fuselage and a tail section, with a pair of gas turbine engines mounted in said tail section and extending vertically above said fuselage;
   said gas turbine engines having a housing with an inlet leading to a fan rotor;
   a bypass door mounted to said aircraft upstream of said inlet to said fan rotor, and said bypass door being moveable away from a non-bypass position to a bypass position to selectively bypass a boundary layer air to a location vertically beneath the pair of engines and away from said inlets; and
   wherein said bypass door is moving to pivot vertically downwardly from an upstream end of said inlet to said gas turbine engine and to a bypass position at which it is spaced vertically beneath said upstream end of said inlet to said engine.

8. The aircraft as set forth in claim 7, wherein said bypass door and said upstream end of said inlet to said fan rotor are both curved.

9. The aircraft as set forth in claim 8, wherein said bypass door is moved to said bypass position at conditions where the fan rotor is being driven more slowly than at other conditions.

10. The aircraft as set forth in claim 9, wherein said conditions where said bypass door is moved to said bypass position include a top of descent condition wherein an associated aircraft is at a relatively high velocity.

11. The aircraft as set forth in claim 7, wherein said bypass door is moved to said bypass position at conditions where the fan rotor is being driven more slowly than at other conditions.

12. The aircraft as set forth in claim 11, wherein said conditions where said bypass door is moved to said bypass position include a top of descent condition wherein an associated aircraft is at a relatively high velocity.

13. The aircraft as set forth in claim 7, wherein said fuselage has a width and height and the width being at least twice said height to define said wide fuselage.

\* \* \* \* \*